March 20, 1962 E. T. HERMAN 3,025,576
REFRIGERATOR DOOR SEAL
Filed Nov. 16, 1959

*INVENTOR.*
EUGENE T. HERMAN
BY
*J. B. Holden*
ATTORNEY 3,025,576
REFRIGERATOR DOOR SEAL
Eugene T. Herman, St. Marys, Ohio, assignor to The Goodyear Tire & Rubber Company, Akron, Ohio, a corporation of Ohio
Filed Nov. 16, 1959, Ser. No. 853,103
4 Claims. (Cl. 20—69)

This invention relates to a gasket or seal for effecting a seal between two parts and more particularly to a gasket for use on a closure member, such as a refrigerator door.

In the past few years substantial work has been done in designing new sealing elements for refrigerator doors. This activity has been the result of not only refrigerator box design changes but also due to the requirements necessitated by legislation enacted by the United States Congress. This legislation requires that the door be able to be opened from within by little force so that many manufacturers have changed completely the means of holding the door closed. Many use magnetic attraction which means that the primary requirement is a soft seal, in other words, one that will create a completely effective seal at very low unit pressures. This requirement is very essential because of the lower temperatures maintained in portions of the refrigerators and the statutory requirement in order to comply with the aforementioned legislation.

A seal that meets the foregoing basic qualifications is shown in U.S. Patent 2,899,721, issued August 18, 1959, and this invention is a modification of the type of seals or gaskets as shown in this patent. It is, therefore, an object of this invention to provide a gasket that seals satisfactorily at low unit pressures.

A further object of the invention is to provide such a gasket with a more accurate control on the distortion of the sealing element as the refrigerator door is closed.

Another object of this invention is to provide a gasket that gives positive directional control of the gasket distention during closing.

A still further object of the invention is to provide a gasket that can be attached to the present refrigerators requiring little, if any, change in the refrigerator design.

Other objects and advantages of this invention will become apparent hereinafter as the description thereof proceeds, the novel features, arrangements and combinations being clearly pointed out in the specification as well as the claims thereunto appended.

Figure 1:
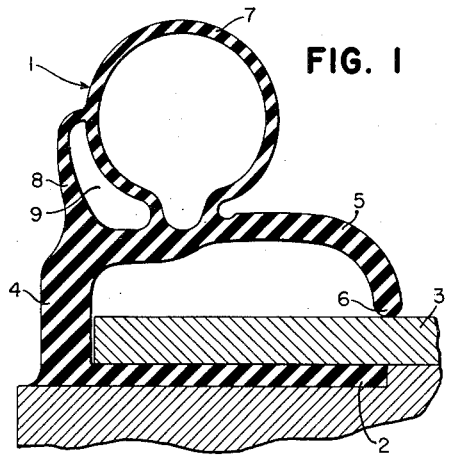
FIG. 1 is a typical cross-sectional view of a refrigerator door gasket incorporating the features of this invention.

The gasket 1 as seen in FIG. 1 is an extruded resilient material such as rubber, natural or synthetic, polyvinylchloride, polyethylene, etc. Such materials are well known for forming gaskets of this type. The gasket 1 includes, as shown, a flange 2 which underlies the inner door panel 3 for positioning and mounting the gasket around the periphery of the door. The flange 2 is a typical means of attaching the gasket 1 to a refrigerator door, but it is understood that the particular means of attaching the gasket to the door and the configuration of the attaching portion may be varied to meet the particular design features of the door structure.

Along one edge of the flange 2 is a rather substantial vertically extending section 4 which supports the main body or sealing portion of the gasket and provides accurate positioning thereof on the door structure. The main body or sealing portion of the gasket 1 includes the generally laterally extending cantilever section 5 which is convexly arched and extends inwardly from the vertical section toward the center of the door in the mounted position. The inner end 6 of the cantilever section 5 rests on the inner door panel 3 and is free to move over the panel 3 surface. Close to the attached end of the cantilever member 5 a hollow tubular member 7 as shown, circular in cross-section, projects upwardly from the upper surface of the cantilever member 5. The wall of the tubular member 7 is relatively thin to provide for easy flex and distortion when it contacts the refrigerator body upon closing.

As a means of directing and controlling the distortion of the tubular member 7 when the refrigerator door is closed, a web portion 8 extends from the attached end of the cantilever member 5 upwardly, then inwardly to its point of attachment substantially at the hollow tubular member 7 at the horizontal centerline thereof. As shown, the web member 8 is tapered in thickness from a thicker section at the end adjacent the vertical member 4 to a thickness substantially the same as the wall of the tubular member 7 at its point of attachment thereto. The web member 8 is generally arched outwardly away from the tubular member 7 so as to create a hollow 9 between the tubular member 7 and the web 8. The particular sectional shape and size of the web member may be varied to fit the design of the particular gasket cross-section and extruding techniques.

Figure 3:
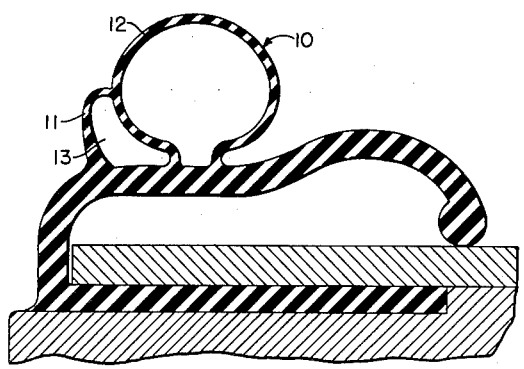
FIG. 3 is a cross-sectional view of a modification of the invention.

In the modification of the refrigerator gasket 10 as seen in FIG. 3, the web member 11 at the end adjacent its point of attachment to the tubular member 12 is modified so as to be in the form of a reverse hook. This is desirable, since the tubular member 10 as shown is of a slightly flattened tubular shape to provide a sufficient length of the web to absorb the lateral movement as the tubular member 10 is distorted without materially affecting the "softness" of the tubular member 10. In addition, the web member 11 also is spaced farther from the tubular member 10 resulting in chamber or hollow 13 therebetween having a slightly greater lateral dimension to provide the necessary clearance for the required flattening of the tubular element 10 under substantially similar low unit pressures.

Figure 4:
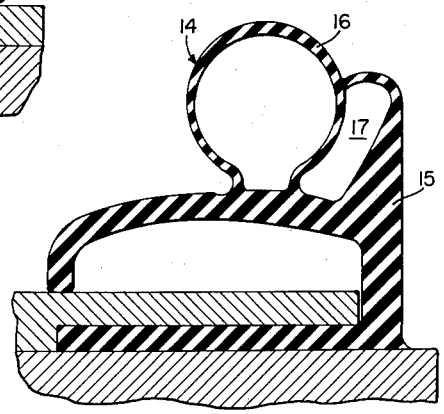
FIG. 4 is a cross-sectional view of another modification of the invention.

In the particular modification of the refrigerator gasket 14 shown in FIG. 4, the web 15 joins the tubular member 16 slightly above the horizontal centerline of the tubular member 16 and forms the hollow 17 therebetween. The upper end web 15 is shaped similar to that described in connection with the gasket illustrated in FIG. 3 and the configuration functions in the same manner.

As can be seen clearly from any of the modifications illustrated, the web members are of such a configuration as to be very flexible, particularly in the area immediately adjacent the point of attachment to the tubular member of the gasket. The thickness of the web in this area in all of the modifications is substantially equal to that of the tubular portion of the gasket so as to present no substantial resistance to the distortion necessary to effect the seal. The thickened portion of the web adjacent its point of attachment to the cantilever member would not interfere, as a result, with the initial distortion of the tubular element but does function as a guide in controlling the position of the tubular element upon flattening. This initial distortion or flattening is the primary source of sealing and the resistance encountered as the tubular member is deflected beyond this point is increased by the cantilever portion and web portion. This increased resistance not only increases the contact pressure of the tubular element against the refrigerator body but counteracts the effects of any compresison set in the gasket which, of course, is highly desirable and necessary.

As can be seen clearly from the four figures of the attached drawing, the tubular members are of appreciable size relative to the cantilever member and the attached portion of the tubular member is small relative to the total periphery of the tubular member. Thus, the peripheral length of the tubular member in the various modified forms shown in FIGS. 1 to 4 is at least about as great as the length of the cantilever member. Also, the length of the portion of the tubular member which is integral with the cantilever member, i.e., the supporting necks of the tubular members, are less than about one fifth of the peripheral length of the tubular member.

Figure 2:
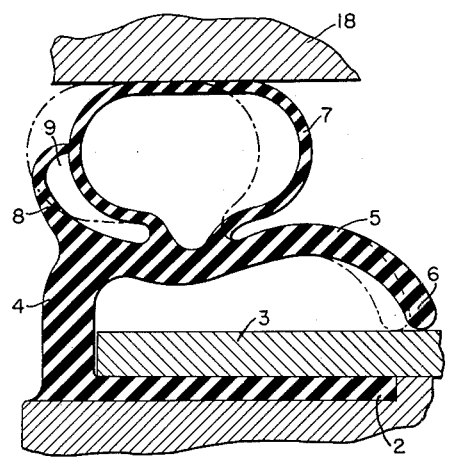
FIG. 2 is a cross-sectional view of the gasket shown in FIG. 1 with the door in the closed position.

For purposes of illustration, the gasket illustrated in FIG. 1 is used in FIG. 2 to demonstrate the functioning of the web member with respect to the tubular member as the seal is made when the refrigerator door is closed. As is seen in FIG. 2, the tubular member 7 is flattened so that a substantial portion of its upper periphery is in contact with the refrigerator body 18. Simultaneously, to a much lesser degree the cantilever member 5 also is flattened to approximately the position shown in FIG. 2 and the web member tends to deflect downwardly and outwardly. Because the web member 8 is attached to the tubular element, the direction of the deflection of the tubular element 7 is uniform along the gasket around the periphery of the refrigerator door. In other words, the web guides the tubular element during deflection to prevent rolling to one side or the other. One position of the collapsed tubular member, without the web 8, is illustrated by the dotted lines as seen in FIG. 2, but another portion of the tubular member 7 could collapse and roll to the opposite side when the door closed.

It is apparent that in any of the forms of the invention shown, the web member is a control to guide the direction of deflection of the tubular member as the seal is effected when the refrigerator door is closed. The particular shapes shown are typical, but it is apparent that there can be many modifications in details made without departing from the principle of the invention. In accordance with well-known practices the outer sealing surface of the tubular element may include ridges or ribs to assist in providing a better contact area.

While certain representative embodiments and details have been shown for the purpose of illustrating the invention, it will be apparent to those skilled in the art that various changes and modifications may be made therein without departing from the spirit or scope of the invention.

Having thus fully described my invention, what I claim and desire to secure by Letters Patent of the United States is:

1. A gasket for a refrigerator door adapted to be secured around the periphery of the door to provide a seal between the door and the refrigerator, said gasket comprising a strip of resilient material of similar cross-sectional shape throughout its length, said cross-section including a base to position and secure said strip on a door, a convexly arched, cantilever member attached only at one end to said base whereby the other end thereof is free to move laterally with respect to said base and a door to which the gasket is secured, a single closed, flexible tubular sealing member substantially circular in cross-section and having an opening therein formed integrally with said cantilever member and said base positioned adjacent said attached end of said cantilever member on the side of the cantilever portion opposite to said base with the outer portion of said tubular member alone effecting the seal by contacting the refrigerator when the door is closed, the wall thickness of said tubular member being substantially uniform throughout the major portion of its section and appreciably less than the wall thickness of said cantilever member, the size of the opening in said tubular member being at least several times greater than said wall thickness of the tubular member, the peripheral length of said tubular member being at least about as great as the length of said cantilever member, and the length of the portion of the wall of the tubular member which is integral with the cantilever member being less than one fifth of said peripheral length of said tubular member, and a web portion extending in an upwardly direction from the attached end of said cantilever member and attached thereto and to the tubular member near the horizontal centerline thereof, the web portion being spaced from the tubular member between its point of attachment thereto and to the cantilever member to create a chamber therebetween to cause the direction of flattening of the tubular member to be substantially normal to the refrigerator by preventing the roll thereof without materially affecting the flexibility thereof, said geometric arrangement between said tubular member, said cantilever member and said web member causing the outer half of the tubular member to project outwardly beyond the remaining portions of the gasket so as to effect the initial seal prior to any substantial deformation of said cantilever member.

2. A gasket for a refrigerator door adapted to be secured around the periphery of the door to provide a seal between the door and the refrigerator, said gasket comprising a strip of resilient material of similar cross-sectional shape throughout its length, said cross-section including a base to position and secure said strip on a door, a convexly arched, cantilever member attached only at one end to said base whereby the other end thereof is free to move laterally with respect to said base and a door to which the gasket is secured, a single closed, flexible tubular sealing member substantially circular in cross-section and having an opening therein formed integrally with said cantilever member and said base positioned adjacent said attached end of said cantilever member on the side of the cantilever portion opposite to said base with the outer portion of said tubular chamber alone effecting the seal by contacting the refrigerator when the door is closed, the wall thickness of said tubular member being substantially uniform throughout the major portion of its section and appreciably less than the wall thickness of said cantilever member, the size of the opening in said tubular member being at least several times greater than said wall thickness of the tubular member, the peripheral length of said tubular member being at least about as great as the length of said cantilever member, and the length of the portion of the wall of the tubular member which is integral with the cantilever member being less than one fifth of said peripheral length of said tubular member, and a web portion extending in an upwardly direction from the attached end of said cantilever member and attached thereto and to the tubular member near the horizontal centerline thereof, the portion of the web adjacent the point of attachment to the tubular member being of a thickness substantially identical to that of said tubular member, the web member being spaced from the tubular member between its point of attachment thereto and to the cantilever member to create a chamber therebetween to cause the direction of flattening of the tubular member to be substantially normal to the refrigerator by preventing the roll thereof without materially affecting the flexibility thereof, said geometric arrangement between said tubular member, said cantilever member and said web member causing the outer half of the tubular member to project outwardly beyond the remaining portions of the gasket so as to effect the initial seal prior to any substantial deformation of said cantilever member.

3. A gasket for a refrigerator door adapted to be secured around the periphery of the door to provide a seal between the door and the refrigerator, said gasket comprising a strip of resilient material of similar cross-sectional shape throughout its length, said cross-section including a base to position and secure said strip on a door, a convexly arched, solid cantilever member attached only at one end to said base whereby the other end thereof is free to move laterally with respect to said base and a door to which the gasket is secured, a single closed, flexible tubular sealing member of substantially circular section and having an opening therein formed integrally with said cantilever member and said base positioned adjacent said attached end of said cantilever member on the side of the cantilever portion opposite to said base with the outer portion of said tubular member alone effecting the seal by contacting the refrigerator when the door is closed, the wall thickness of said tubular member being substantially uniform throughout the major portion of its section and appreciably less than the wall thickness of said cantilever member, the diameter of said circular tubular member being at least several times greater than said wall thickness of the tubular member, the circumference of said tubular member being at least as great as the length of said cantilever member, and the length of the portion of the wall of the tubular member which is integral with the cantilever member being less than one-fifth of the circumference of said tubular member, and a generally convexly arched web portion along the edge of the gasket extending between and attached to the attached end of said cantilever member and tubular member near the mid-point of said tubular member to cause the flattening of the tubular member to be in a controlled substantially uniform vertical direction, the geometric arrangement between said tubular member, said cantilever member and said web member causing the outer half of the tubular member to project outwardly beyond the remaining portions of the gasket so as to effect the initial seal prior to any substantial deformation of said cantilever member.

4. A gasket for a refrigerator door adapted to be secured around the periphery of the door to provide a seal between the door and the refrigerator, said gasket comprising a strip of resilient material of similar cross-sectional shape throughout its length, said cross-section including a base to position and secure said strip on a door, a convexly arched, solid cantilever member attached only at one end to said base whereby the other end thereof is free to move laterally with respect to said base and a door to which the gasket is secured, a single closed, flexible tubular sealing member of substantially circular section and having an opening therein formed integrally with said cantilever member and said base positioned adjacent said attached end of said cantilever member on the side of the cantilever portion opposite to said base with the outer portion of said tubular member alone effecting the seal by contacting the refrigerator when the door is closed, the wall thickness of said tubular member being substantially uniform throughout the major portion of its section and appreciably less than the wall thickness of said cantilever member, the diameter of said circular tubular member being at least several times greater than said wall thickness of the tubular member, the circumference of said tubular member being at least as great as the length of said cantilever member, and the length of the portion of the wall of the tubular member which is integral with the cantilever member being less than one-fifth of the circumference of said tubular member, and a generally convexly arched web portion along the edge of the gasket extending between and attached to the attached end of said cantilever member and tubular member near the mid-point of said tubular member to cause the flattening of the tubular member to be in a controlled substantially uniform vertical direction, the portion of the web adjacent the point of attachment to the tubular member being of a thickness substantially identical to that of said tubular member, the web member being spaced from the tubular member between its point of attachment thereto and to the cantilever member to create a chamber therebetween to cause the direction of flattening of the tubular member to be substantially normal to the refrigerator by preventing the roll thereof, without materially affecting the flexibility thereof, the geometric arrangment between said tubular member, said cantilever member and said web member causing the outer half of the tubular member to project outwardly beyond the remaining portions of the gasket so as to effect the initial seal prior to any substantial deformation of said cantilever member.

References Cited in the file of this patent
UNITED STATES PATENTS

| | | |
|---|---|---|
| 2,767,040 | Kesling | Oct. 16, 1956 |
| 2,899,721 | Herman | Aug. 18, 1959 |
| 2,908,949 | Frehse | Oct. 20, 1959 |